United States Patent

Kruer et al.

Patent Number: 6,050,286
Date of Patent: Apr. 18, 2000

[54] SEQUENCING VALVE

[75] Inventors: Thomas R. Kruer, Edgewood, Ky.; Kenneth J Bruninga, Mapleton; Gary Redhead, East Peoria, both of Ill.

[73] Assignee: L.R. Nelson Corporation, Peoria, Ill.

[21] Appl. No.: 09/130,770

[22] Filed: Aug. 7, 1998

Related U.S. Application Data

[60] Provisional application No. 60/055,408, Aug. 7, 1997.

[51] Int. Cl.[7] .................................................. F16K 21/00
[52] U.S. Cl. ...................................................... 137/119.03
[58] Field of Search .......................... 137/119.03, 119.09

[56] References Cited

U.S. PATENT DOCUMENTS

| | | | |
|---|---|---|---|
| 2,893,416 | 7/1959 | Hegstad | 137/119.03 |
| 3,635,237 | 1/1972 | Kah, Jr. | 137/119.03 |
| 4,492,247 | 1/1985 | Lockwood | 137/119.03 |
| 5,016,664 | 5/1991 | Cole | 137/1 |

*Primary Examiner*—Steven O. Douglas
*Attorney, Agent, or Firm*—Mayer Brown & Platt

[57] ABSTRACT

The present device relates to an apparatus and method for automatically sequencing the flow of fluid between one fluid source and at least two fluid chambers in response to an interruption of fluid flow or pressure. Particularly, the device relates to irrigation. In its preferred embodiment, the apparatus is a sequencing valve that includes a two-sided flapper valve that is controlled by a spring and piston mechanism in order to direct fluid flow between chambers. In an alternate embodiment, the device includes a mechanism that also allows manual sequencing of fluid flow.

37 Claims, 6 Drawing Sheets

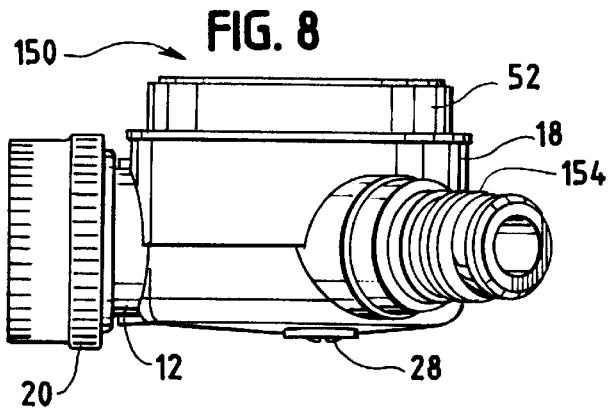
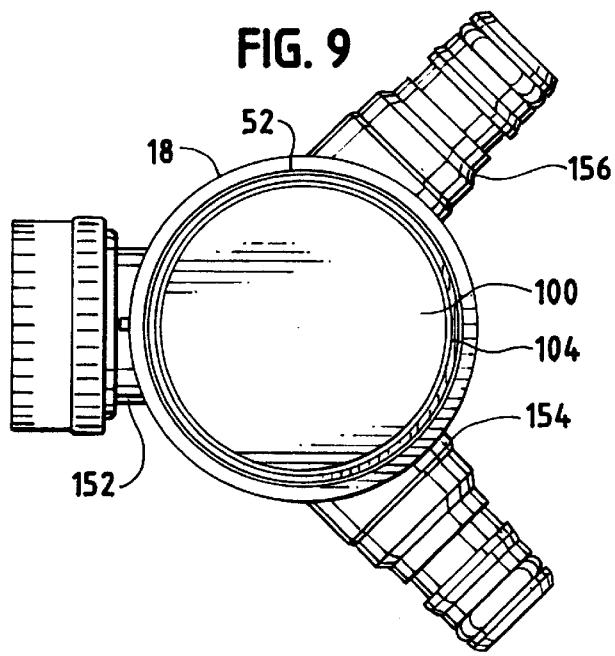
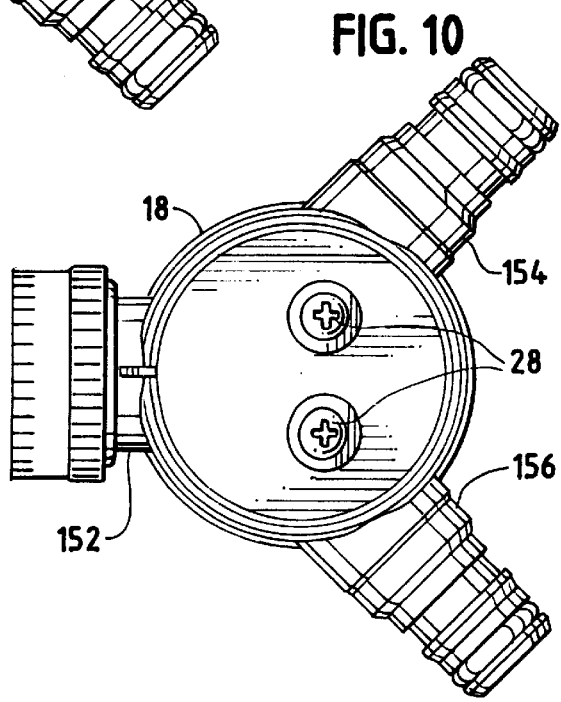

SEQUENCING VALVE

FIELD OF THE INVENTION

This Application claims the benefit of U.S. Provisional Application No. 60/055,408, filed Aug. 7, 1997. The present invention relates to a valve capable of redirecting or sequencing the flow of fluid between two outlets. More particularly, the invention relates to a valve for automatically sequencing fluid flow between a first fluid outlet and a second fluid outlet in response to a selective fluctuation or interruption of fluid pressure.

BACKGROUND OF THE INVENTION

It is common practice to irrigate lawns, gardens and other areas requiring regular water application. This practice generally involves connecting a hose and appropriate hose end implement, such as a sprinkler, to a sillcock or similar water faucet. It often is necessary, however, to relocate the hose end implement a number of times during the process to ensure the entire area desired is completely irrigated. This process not only is time consuming and frustrating, but also often results in undesirable water loss.

One known solution requires installing a permanent irrigation network capable of irrigating an entire area without requiring relocation of a hose end implement. If sufficient water pressure is not available to operate the entire irrigation simultaneously, a number of control valves may be provided to isolate and selectively operate individual zones of irrigation. Although extremely effective and desirable, the initial investment associated with such irrigation systems may be considered cost prohibitive.

As an alternative, it also is known to provide a sequencing valve capable of redirecting fluid from a single supply to a number of different outlets in a sequential manner. Preferably, these valves automatically redirect the fluid flow upon interruption of fluid pressure within the valve. Such valves therefore are particularly beneficial when used in combination with a conventional timer device.

For example, U.S. Pat. No. 4,921,002 to Christon and U.S. Pat. No. 5,016,664 to Cole each disclose a switching valve capable of directing water from a single inlet to one of two different outlets. Each of these valves, however, require the use of a sophisticated operating mechanism to accomplish such switching functions—often resulting in unreliable or delayed operation. Additionally, these valves do not allow selective operation; rather, redirection of fluid flow can only be accomplished by interrupting the fluid pressure within the valve.

In view of the above, there remains a need for a reliable valve capable of automatically sequencing fluid flow from a single fluid source to one of two outlets in response to an interruption of fluid flow or pressure. Particularly, there is a need for such a sequencing valve that does not require complex operating mechanism for operation. There also remains a need for a sequencing valve capable of manual selective operation, without requiring such interruption if desired.

SUMMARY OF THE INVENTION

The purpose and advantages of the invention will be set forth in and apparent from the description and drawings that follow, as well as will be learned by practice of the invention. Additional advantages of the invention will be realized and attained by the elements of the apparatus and method described.

To achieve these and other advantages and in accordance with the purpose of the invention, as embodied and broadly described herein, a new and useful sequencing valve is provided. In accordance with one aspect of the invention, the sequencing valve includes a body having an interior compartment, as well as a fluid inlet and first and second fluid outlets in fluid communication therewith. A core element is mounted within the body compartment to define an inlet chamber, and first and second outlet chambers corresponding to the first and second fluid outlets, respectively. Alternatively, these chambers can be defined directly within the body without use of a core element.

Particularly, the core element includes first and second chamber walls to define the inlet chamber, and a piston wall to further define the first outlet chamber and the second outlet chamber. Fluid communication is available from the inlet chamber to the first and second outlet chambers through first and second outlet openings formed in the first and second chamber walls, respectively. A top plate is provided on the core element to enclose and seal the separate inlet and outlet chambers, as well as to further define a component chamber to house the various valve components therein. To enhance sealing engagement with the body, the core element is overmolded with a resilient layer. The core element may be releasably mounted within the compartment of the valve body, or securely affixed.

A two-sided flapper valve is disclosed in the preferred embodiment, although an alternative valve mechanism such as a ball or gate valve may be used if desired. The flapper valve is pivotally mounted on a valve shaft for movement within the inlet chamber between the first outlet opening and the second outlet opening. The flapper valve is configured to seal either of the two outlet openings so as to redirect fluid flow to the other.

A passage extends through the piston wall of the core element between the first outlet chamber and the second outlet chamber. A piston, capable of movement between the first outlet chamber and the second outlet chamber, is disposed within the passage. Fluid pressure within one outlet chamber therefore acts against a corresponding exposed end of the piston so as to urge the piston toward the other outlet chamber. Additionally, a groove or similar recess is provided on the piston so as to be engaged by a piston lever mounted within the component chamber. Particularly, the piston lever is pivotally mounted on the top plate of the core element and extends therethrough. Alternatively the piston lever an be mounted to allow axial motion. Axial movement of the piston between the first outlet chamber and the second outlet chamber therefore pivots the piston lever accordingly. A valve lever arm likewise is attached to an exposed portion of the flapper valve shaft within the component compartment.

For actuation of the flapper valve, a spring is provided between the lever and the valve lever arm. The spring is connected so as to be compressed into an overcentered position in response to axial movement of the piston, and thus pivotal movement of the piston lever, during operation of the sequencing valve.

Particularly, and with the second outlet opening initially closed by the flapper valve, pressurized fluid introduced into the inlet chamber will be directed through the first outlet opening and into the first outlet chamber for discharge through the first fluid outlet. Fluid pressure within the first outlet chamber will act against the exposed end of the piston so as to urge the piston toward the second outlet chamber, thus pivoting the piston lever and compressing the spring into an overcentered position. When the fluid flow through the fluid inlet is interrupted, the spring will release from its compressed overcentered condition so as to bias the flapper valve into engagement with the valve seat of the first outlet opening. Subsequent fluid flow through the fluid inlet and into the inlet chamber therefore will be directed through the second outlet opening and into the second outlet chamber for discharge through the second fluid outlet. The piston will be urged back toward the first outlet chamber due to fluid pressure on the corresponding exposed end of the piston and the spring will again be compressed into an overcentered position so as to bias the flapper valve back into engagement with the valve seat of the second outlet opening when fluid flow is interrupted.

Additionally, a cover plate is provided to enclose the component chamber and protect the various components contained therein from dirt and debris. If desired, the cover plate may be rotably mounted and interconnected with the flapper valve so as operate as an indicator to identify the resulting direction of fluid flow through the sequencing valve. This configuration likewise allows manual operation of the sequencing valve by manually repositioning the flapper valve to redirect fluid flow selectively, if desired. Alternative valve mechanisms or fluid connectors also may be used.

The sequencing valve can be used with a conventional timer device to provide a low-cost alternative to traditionally installed systems. This facilitates a hands-off method for watering two separate areas.

It is to be understood that both the foregoing general description and the following detailed description are exemplary and provided for purposes of explanation only, and are not restrictive of the invention.

BRIEF DESCRIPTION OF THE DRAWINGS

The accompanying drawings, which are incorporated in and constitute a part of this specification, illustrate a preferred embodiment of the invention, and together with the description, serve to explain the principles of the invention.

FIG. 8 is a side view of a second embodiment of the sequencing valve according to the present invention.

FIG. 9 is a top view of the sequencing valve shown in FIG. 8.

FIG. 10 is a bottom view of the sequencing valve shown in FIG. 8.

DETAILED DESCRIPTION OF THE PREFERRED EMBODIMENT

Figure 1:
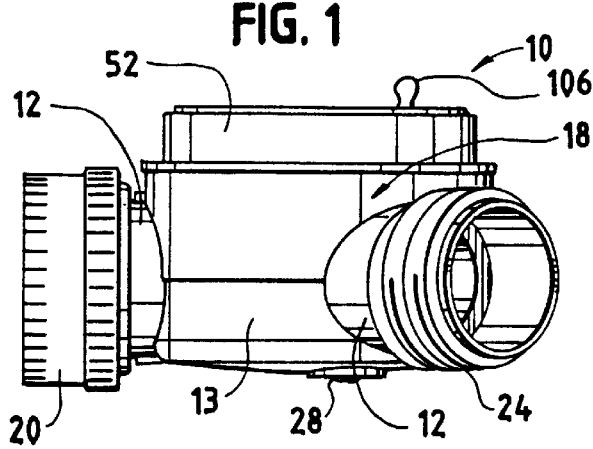
FIG. 1 is a side view of a representative embodiment of the sequencing valve of the present invention.
Figure 2:
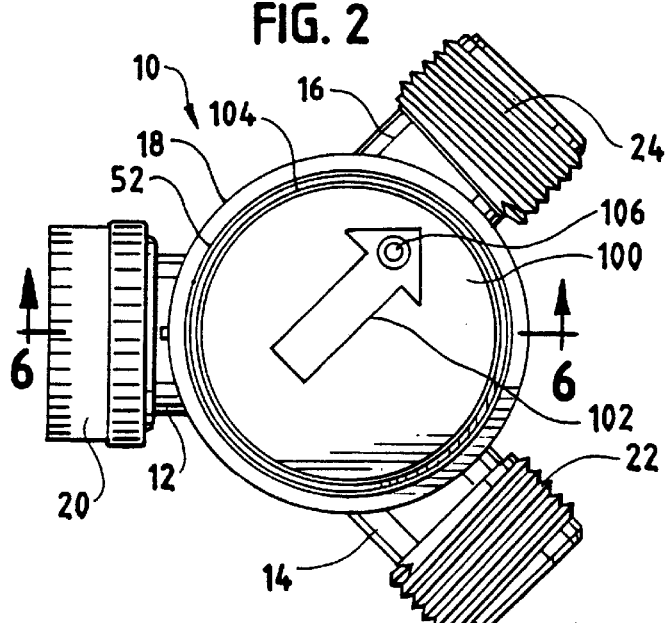
FIG. 2 is a top view of the sequencing valve of FIG. 1.

Reference will now be made in detail to a preferred embodiment of the sequencing valve of the present invention, examples of which are illustrated in the accompanying drawings. Wherever possible, the same reference characters will be used throughout the drawings to refer to the same or like parts. The method of using the present invention will be described in conjunction with the detailed description of the sequencing valve.

For purpose of illustration and not limitation, FIGS. 1–6 show a representative embodiment of the sequencing valve of the present invention, which is designated generally by reference character 10. In accordance with one aspect of the invention, a sequencing valve 10 is provided to alternate or sequence fluid flow, which is supplied from a single source, between a number of fluid outlets.

The valve 10 generally includes a body 18 having at least a bottom wall 11 and a peripheral wall 13 so as define an interior compartment 15 therein. As best shown in FIGS. 2–6, the body 18 embodied herein preferably is formed with a generally cylindrical shape. A fluid inlet 12 and at least two fluid outlets 14 and 16 extend radially from the peripheral wall 13 in fluid communication with the interior compartment 15. The fluid outlets 14 and 16 of the preferred embodiment are centered about the axis of inlet 12.

The fluid inlet 12 and each fluid outlet 14 and 16 are generally cylindrical in shape. The fluid inlet 12 embodied herein includes a coupling 20, preferably rotatable, having a threaded arrangement to allow attachment of the fluid inlet 12 in fluid communication to a standard sillcock or faucet (not shown). Similarly, each of the fluid outlets 14 and 16 are provided with a threaded arrangement 22 and 24 to allow attachment of respective hoses or pipes in fluid communication therewith. As shown in FIGS. 8–10, an alternative connection arrangement may be used to replace the threaded arrangements shown in FIGS. 1–6. For example, the fluid outlets 154 and 156 may be provided with ridges to receive spring-biased detents of a conventional quick connector assembly, or the ridges may be configured to engage the interior surface of a spliced hose if desired.

As shown in FIGS. 1–6, the body 18 preferably is molded with the fluid inlet 12 and outlets 14 and 16 as a single piece element to minimize leakage between joints and to resist tension induced upon the fluid outlets 14 and 16 by a connected hose. Conventional injection molding techniques using a durable plastic material is preferred, although not required. Separate components for the inlet 12 and outlets 14 and 16 likewise may be used if desired.

The sequencing valve 10 of the present invention further includes a core element 26 mounted within the interior compartment 15 of the body 18. The core element 26 is provided to define separate chambers within the interior compartment 15 of the body 18. Generally, and as described further below, the core element 26 defines an inlet chamber corresponding to the fluid inlet 12, a first outlet chamber corresponding to the first fluid outlet 14, and a second outlet chamber corresponding to the second fluid outlet 16. The actual configuration of the core element required to define these chambers, however, will depend upon the type of valve mechanism used. That is, the configuration required for use with a flapper valve will differ from that required if a ball valve is desired.

Figure 5:
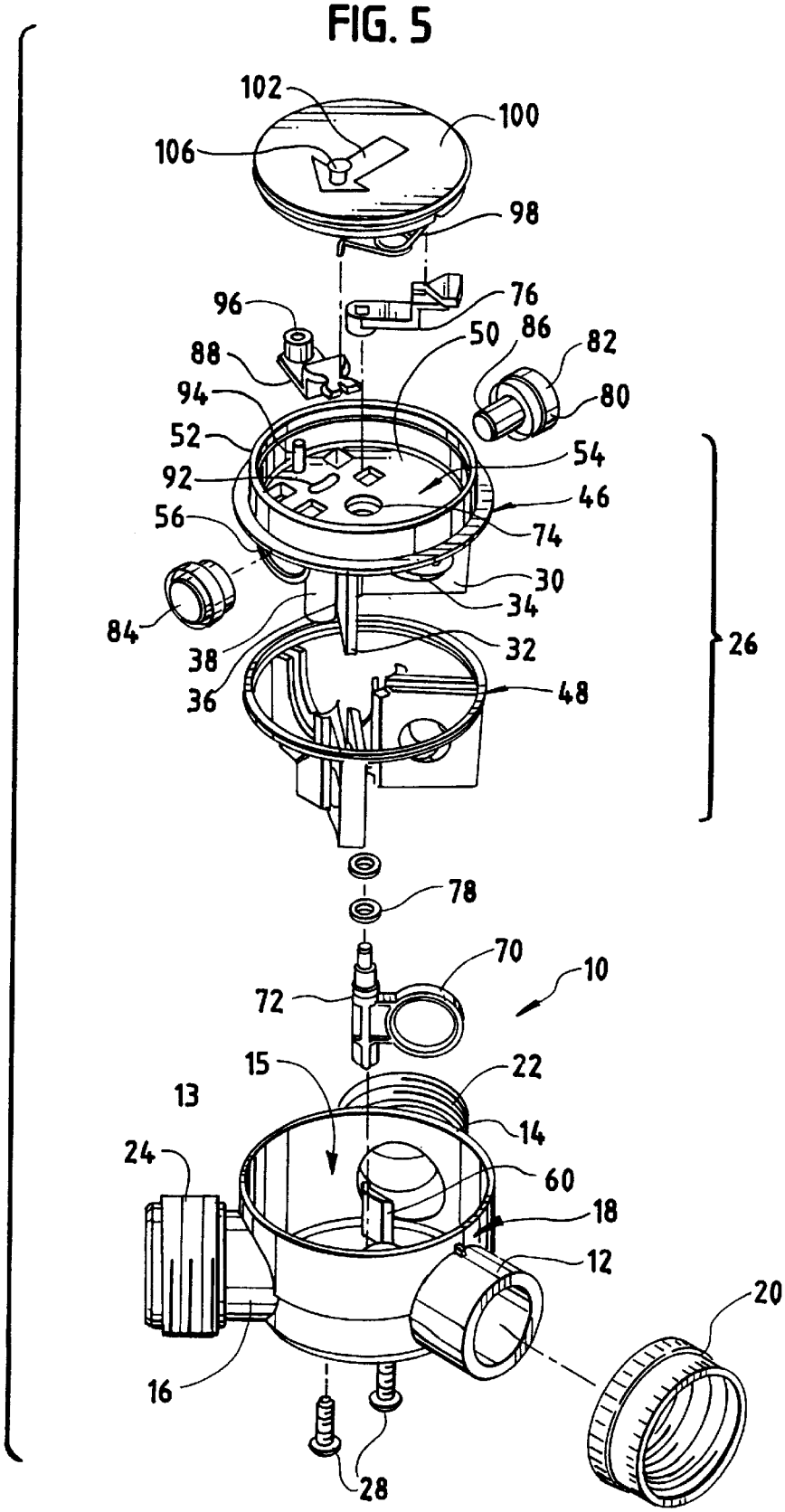
FIG. 5 is an exploded perspective view of the components of the sequencing valve of FIG. 1.

For purpose of illustration and not limitation, FIG. 5 shows the configuration of a core element 26 for use with a flapper valve as will be described further below. The core element 26 generally includes three dividing walls 30, 32, 38 to separate the interior compartment 15 of the body 18 into the three desired chambers. Preferably, although not necessarily, these three dividing walls 30, 32, 38 are arranged radially and spaced equally from each other. Particularly, the core element 26 includes a first chamber wall 30 having a first outlet opening 34 therethrough and a second chamber wall 32 having a second outlet opening 36 therethrough. The first and second chamber walls 30 and 32 are positioned within the compartment 15 so as to define an inlet chamber 44 proximate the fluid inlet 12. In this manner, the inlet chamber 44 is configured to initially receive fluid from the fluid inlet 12.

The third dividing wall of the core element 26, i.e., the piston wall 38, is arranged opposite the inlet chamber 44 and positioned between the first chamber wall 30 and the second chamber wall 32. FIG. 5 shows the piston wall 38 located equidistant between the chamber walls 30 and 32. In this manner, and as further shown in FIG. 7, a first outlet chamber 40 is defined proximate the first fluid outlet 14 and a second outlet chamber 42 is defined proximate the second fluid outlet 16.

The first outlet opening 34 in the first chamber wall 32 allows fluid communication from the inlet chamber 41 to the first outlet chamber 40, and the second outlet opening 36 allows fluid communication from the inlet chamber 44 to the second outlet chamber 42. Extending through the piston wall 38 is a passage to receive a piston 80 moveably therein. The piston wall 38, in combination with the piston 80 to be described, prevents fluid communication directly between the first outlet chamber 40 and the second outlet chamber 42.

The core element 26 further includes a top plate 50 to enclose the interior compartment 15 of the body 18 and, thus, the separate chambers 40, 42, 44 defined therein. Particularly, the top plate 50 is provided in sealing engagement with the peripheral wall 13 of the body 18 to prevent fluid from escaping therebetween. A flange 52 extends upward from the top plate 50. In combination with top plate 50, the flange 52 thereby forms a component chamber 54 to house various components of the sequencing valve 10 as will be described. In this manner, the components housed within the component chamber 54 can be isolated from the fluid flowing through the sequencing valve 10, as well as protected from dirt and debris outside the component chamber.

In the preferred embodiment of the invention, the core element 26 is manufactured using a durable inner structure 46. The inner structure 46 is constructed of hard plastic material, such as polycarbonate/acrylonitril butadiene styrene (PC/ABS) although other like materials may be used. The inner structure 46 is then overmolded with a resilient layer 48, shown separately in the exploded view of FIG. 5 for convenience, to coat the first and second chamber walls 30 and 32 as well as the piston wall 38. This resilient layer 48 is formed using a softer material, such as a thermoplastic elastomer or the like, although other water resistant materials such as rubber may be used if desired. This resilient layer 48 thereby enhances the sealed engagement between the body 18 and the edges of the walls 30, 32, 38 and the top plate 50. Additionally, and as described further below, this resilient layer 48 provides an enhanced valve seat around the first outlet opening 34 and the second outlet opening 36.

Figure 3:
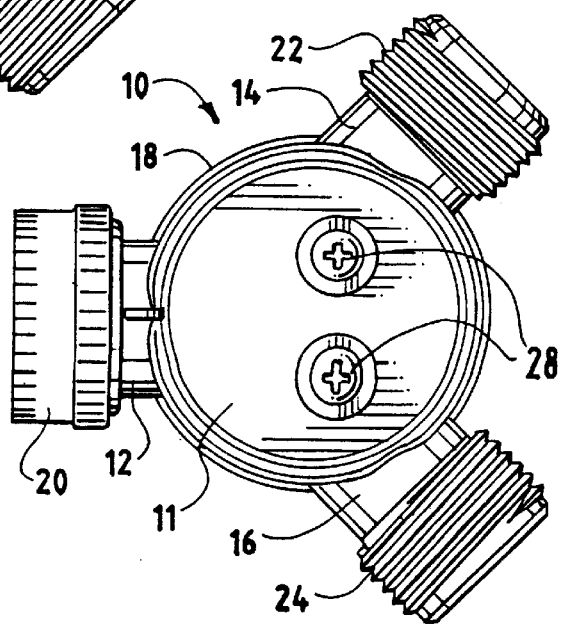
FIG. 3 is a bottom view of the sequencing valve of FIG. 1.

Preferably, the core element 26 is releasably mounted to the body 18 using conventional fasteners such as threaded screws 28, as shown in FIG. 3. In this manner, separate components can be inspected, repaired and replaced more readily. Alternatively, more secure attachment configurations may be used if desired, such as ultrasonic welding or other suitable means. By molding the body 18 and the core element 26 separately, construction of these parts is greatly simplified. Additionally, the core element 26, when molded separately, may be tested for proper operation as a subassembly prior to final assembly with the body 18.

The valve mechanism embodied herein is a two-sided flapper valve 70, although it is understood that an alternative valve mechanism may be used if an appropriate core element configuration is provided. The flapper valve 70 is positioned within the inlet chamber 44 and is pivotally mounted for movement between the first outlet opening 34 of the first chamber wall 30 and the second outlet opening 36 of the second chamber wall 32. Particularly, and as embodied herein, the flapper valve 70 includes a valve shaft 72 positioned within the core element 26 proximate the intersection of the three dividing walls 30, 32, 34. As describe further below, the valve shaft 72 extends through the top plate 50 of the core element 26 and is provided with a seal 78 or the like to prevent leakage there across. Preferably, although not necessarily, the valve shaft 72 is formed integral with the flapper valve 70. A durable material such as a formaldehyde polymer known as acetal or the like may be used as the material of construction for the flapper valve 70.

Figure 7A:
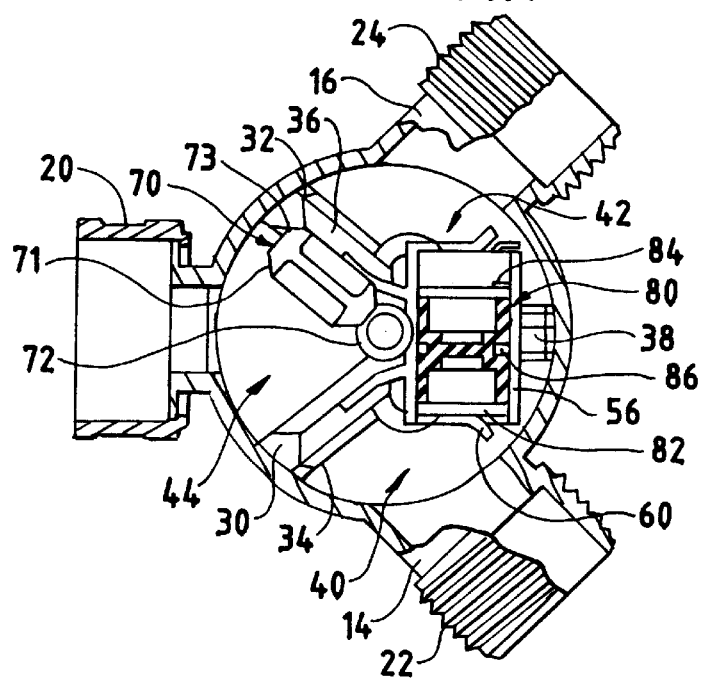
FIG. 7A is a top partial cross sectional view of the valve in FIG. 1 in an initial position.
Figure 7B:
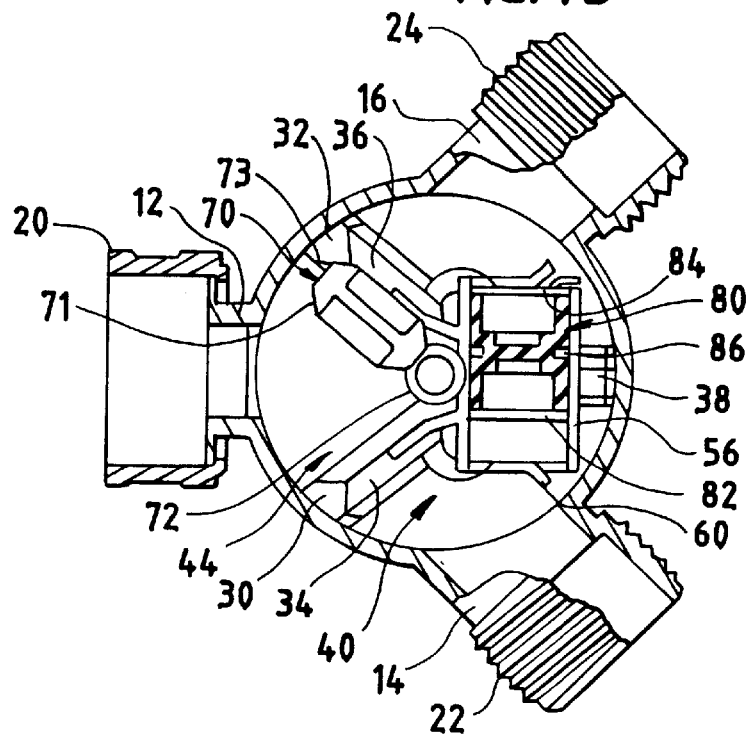
FIG. 7B is a top partial cross sectional view of the valve in FIG. 7A after fluid flow is initiated.
Figure 7C:
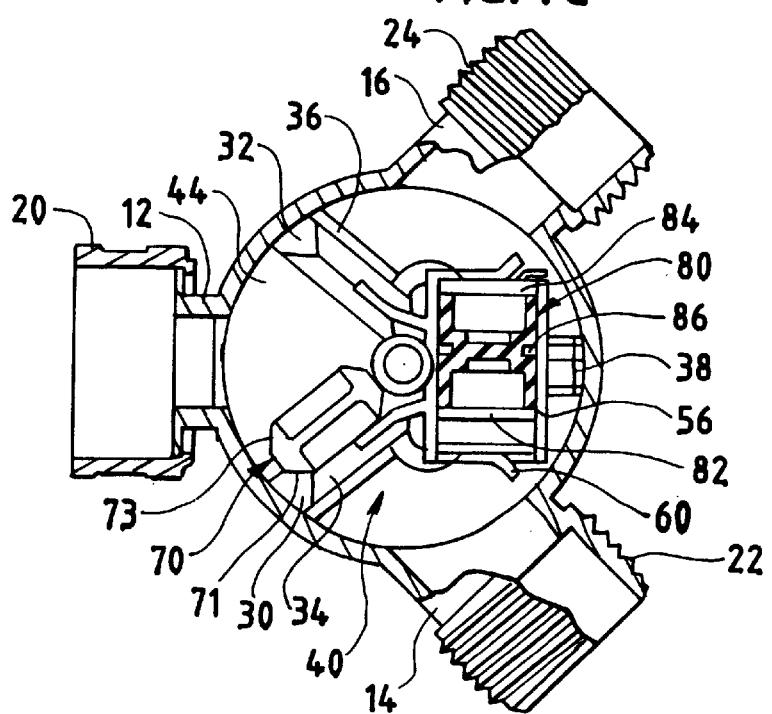
FIG. 7C is a top partial cross sectional view of the valve in FIG. 7B after fluid flow is interrupted.

The flapper valve 70 is configured with two sealing faces—one 71 corresponding to the valve seat of the first outlet opening 34 and the other 73 corresponding to the valve seat of the second outlet opening 36. In this manner, the single flapper valve 70 may be used selectively to seal either of the two outlet openings to redirect fluid flow to the other. For example, FIG. 7A shows the flapper valve 70 positioned in engagement with the second outlet opening 36 to allow fluid flow through the first outlet opening 34. By contrast, FIG. 7C shows the flapper valve 70 moved into engagement with the first outlet opening 34 for fluid flow through the second outlet opening 36.

As previously noted, and in accordance with the present invention, a passage 56 extends through the piston wall 38 between the first outlet chamber 40 and the second outlet chamber 42. A piston 80, capable of movement between the first outlet chamber 40 and the second outlet chamber 42, is disposed within the passage 56. Particularly, and as best shown in FIGS. 7A–7C, each end 82, 84 of the piston 80 is exposed to fluid communication with a respective outlet chamber 40, 42. In this manner, fluid pressure within the first outlet chamber 40 will urge the piston 80 toward the second outlet chamber 42, as shown in FIG. 7B, while fluid pressure within the second outlet chamber 42 will urge the piston 80 toward the first outlet chamber 40. A stop member 60 is located at either end of the passage 56 to prevent the piston 80 from extending beyond the limits of the passage 56.

Figure 6:
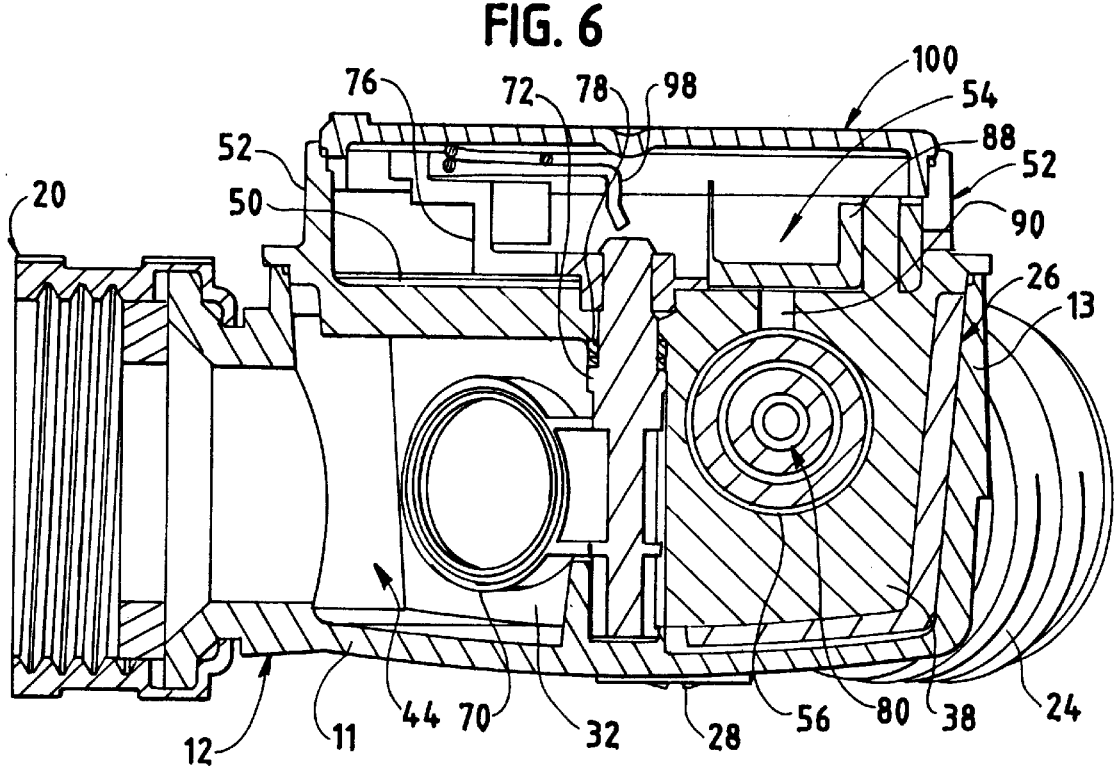
FIG. 6 is a cross sectional view along line 6—6 in FIG. 2.

Although not required, FIGS. 5–6 show that the passage 56 and piston 80 embodied herein are generally cylindrical in shape. To simplify construction and placement of the piston 80 within the passage 56, as well as to enhance sealing across the length of the piston 80, the piston 80 embodied herein is constructed of two separate pieces. These separate pieces may snap together, or simply operate in an abutting engagement. If separated pieces are used, they must be held in straight alignment with each other. Alternatively, the piston 80 may be constructed as a single piece if desired.

A groove or similar recess 86 is provided on the piston 80. Similarly, an arcuate slot 92 is formed through the top plate 50 of the core element 26 proximate the location of the recess 86. The piston lever 88 is pivotally mounted within the component chamber 54 on the top plate 50. Alternatively, the piston lever 88 can move linearly. Particularly, the piston lever 88 includes a pivot end 96 connected to a pivot pin 94 extending from the top plate 50 and a downwardly depending actuation post 90 extending through the arcuate slot 92 and into engagement with the recess 86. The arcuate slot 92 is appropriately configured such that axial movement of the piston 80 between the stop members 60 will pivot the lever 88 accordingly.

Figure 4:
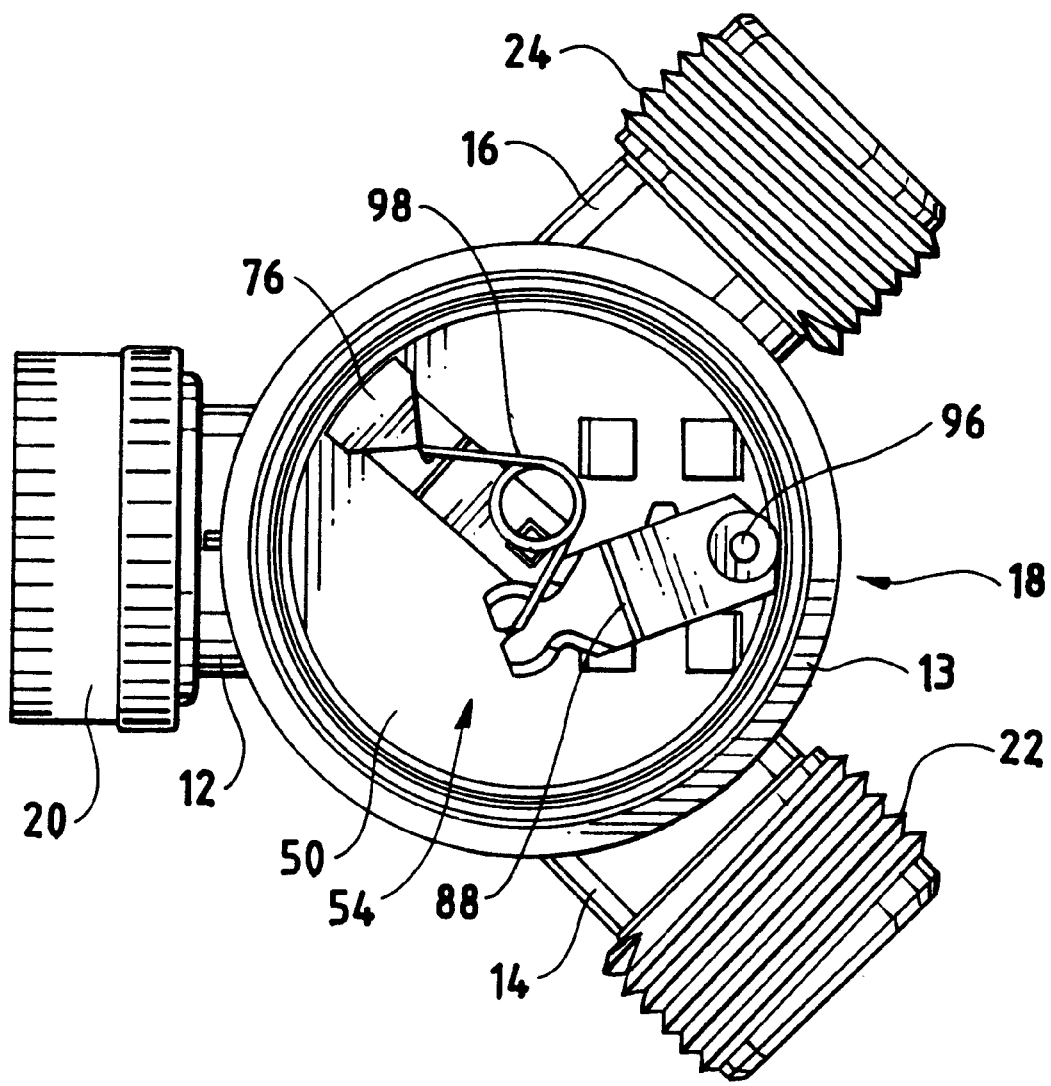
FIG. 4 is a top view of the sequencing valve of FIG. 1, with the cover plate removed.

As noted above, the valve shaft 72 of the flapper valve 70 extends through an opening 74 in the top plate 50 of the core element 26 and into the component chamber 54. This opening 74 is sealed by a seal 78 to prevent leakage of pressurized fluid from the compartment 15 into the component chamber 54. As shown in FIGS. 4–6, a valve lever arm 76 provided within the component chamber 54 is attached to the exposed top end of the valve shaft 72 and generally aligned with the flapper valve 70. In this manner, movement of the valve lever arm 76 will pivot the flapper valve 70 accordingly.

Further in accordance with the present invention, a spring 98 is provided between the piston lever 88 and the valve lever arm 76. A variety of different spring configurations and materials of construction may be used. For example, but not by limitation, FIGS. 4 and 5 show a torsion spring 98 extending between and connected to the piston lever 88 and the valve lever arm 76 within the component chamber 54. Particularly, the spring 98 is freely connected to allow the ends of the spring 98 to move relative to the piston lever 88 and valve lever arm 76 without disengaging therefrom. In this manner, and as will be further described below, the torsion spring 98 will be compressed into an overcentered position in response to axial movement of the piston 80, and thus pivotal movement of the piston lever 88, during operation of sequencing valve 10.

A cover plate 100 is provided to enclose the component chamber 54 and protect the various components contained therein from dirt and debris. Although not required, the cover plate 100 preferably is rotatably mounted on the body 18 and interconnected with the valve lever arm 76 for corresponding movement therewith. Alternatively, the cover plate can be fixed with an indicator on the valve lever. By providing an appropriate marking or indicia 102, the cover plate 100 may operate as an indicator to identify the resulting direction of fluid flow based upon the position of the valve lever arm 76. Additionally, an optional finger engaging member 106 may be provided on the cover plate 100 to allow manual operation of the sequencing valve 10 by repositioning the flapper valve 70 to redirect fluid flow.

The operation of the sequencing valve 10 of the present invention will now be described, with particular reference to FIG. 7A–7C. FIG. 7A shows the flapper valve 70 in an initial position, wherein the first outlet opening 34 is opened and the second outlet opening 36 is sealed closed due to the torsion spring 98 biasing the valve lever arm 76 so as to engage the flapper valve 70 against the second chamber wall 32. At this time, the piston 80 is initially positioned proximate the first outlet chamber 40.

When pressurized fluid is introduced through the inlet 12 and into the inlet chamber 44, the second outlet opening 36 will remain closed due to the flapper valve 70. Indeed, fluid pressure acting on the flapper valve 70 will further enhance the seal between the valve seat 73 and the resilient layer 48 of the second outlet opening 36. Fluid flow therefore will be directed through the first outlet opening 34 and into the first outlet chamber 40 for discharge through the first fluid outlet 14. Because the pressure within the second outlet chamber 42, i.e., atmospheric, will be sufficiently less than that of the first outlet chamber 40, the fluid pressure within the first outlet chamber 40 will act against the exposed end 82 of the piston 80 id so as to urge the piston 80 toward the second outlet chamber 42 as shown in FIG. 7B. This movement of the piston 80 likewise will pivot the lever 88 due to engagement between the recess 86 and post 90.

Although connected via the spring 98, the flapper valve 70 will not pivot out of engagement with the valve seat of the second outlet opening 36 until fluid pressure within the inlet chamber 44 is sufficiently reduced or interrupted. This is because the hydraulic force on the flapper valve 70 is greater than the force provided by the overcentered spring 98 and any mechanical advantage of the valve lever 76. As a result, the torsion spring 98 will be compressed into an overcentered position when the piston 80 is urged toward the second outlet chamber 42.

When the fluid flow through the fluid inlet 12 is interrupted or sufficiently reduced, such as by a timer or manual adjustment of the sillcock, fluid pressure within the inlet chamber 44 and the first outlet chamber 40 will be interrupted or reduced respectively. Without sufficient fluid pressure to maintain the position of the flapper valve 70, the torsion spring 98 will release from its compressed overcentered condition so as to bias the valve lever arm 76, and thus the flapper valve 70, toward the first chamber wall 30. As a result, the second outlet opening 36 will be opened and the flapper valve 70 will be urged into sealing engagement with the valve seat of the first outlet opening 34 as shown in FIG. 7C. By providing a spring 98 of appropriate size, the flapper valve 70 will move quickly and efficiently to its new position to close the first outlet opening 34. Reliability therefore is enhanced and fluid loss minimized.

Subsequent fluid flow through the fluid inlet 12 and into the inlet chamber 44 will be directed through the second outlet opening 36 and into the second outlet chamber 42 for discharge through the second fluid outlet 16. As a result, the piston 80 will be urged back toward the first outlet chamber 40 and the torsion spring 98 will again be compressed into an overcentered position. This condition will be maintained until fluid flow is again interrupted or reduced so as to allow the torsion spring 98 to bias the flapper valve 70 back into engagement with the valve seat of the second outlet opening 36 as shown in FIG. 7A.

This operation cycle can be repeated continuously as desired. Alternatively, the cover plate 100 may be rotated to select the desired position of flow as indicated by the marker 102, without interrupting the fluid flow. Upon rotation of the cover plate 100, the flapper valve 70 will be pivoted accordingly, and then held into position by the pressure of the fluid on the valve, the piston will move to the other side overcentering the spring.

As previously noted, alternate configurations of the preferred embodiment likewise may be provided in accordance with the present invention. For example, the flapper valve 70 may be replaced by a ball valve, a gate valve or other valve mechanism capable of directing flow between two different outlets. Additionally, alternative fluid end connectors may be used, such as shown in FIGS. 8–10. This alternative embodiment 150 is operationally similar to that of FIGS. 1–7, however, the inlet 152 and outlets 154 and 156 include conventional quick connectors. That is, the outlets 154 and 156 may be provided with circumferential ridges to receive spring-biased detents of a mating coupler or the like. Other types of end connectors likewise may be used within the scope of this invention.

The present invention has several advantages. The present invention may be used in conjunction with a mechanical or electronic timer to automatically control fluid flow to two different irrigation zones. The simple mechanical construction of the sequencing valve allows a quick and reliable operation of the valve with minimal fluid loss, and the relatively few required components provide for more durable construction. Additionally, the present invention may be constructed sufficiently small in size for use on sillcocks located close to ground level, and allows visual indication and manual selection of fluid flow.

Although reference has been made to the operation and features of the representative embodiment of the sequencing valve of the present invention for the purpose of explanation, it is understood that alternative operations and features likewise may be provided. It also will be apparent to those skilled in the art that various modifications and variations can be made in the design and construction of the sequencing valve without departing from the scope or spirit of the invention.

Other embodiments of the invention will be apparent to those skilled in the art from consideration of the specification and practice of the invention disclosed herein. It is intended that the specification and examples be considered as exemplary only and not limiting the true scope and spirit of the invention.

We claim:

1. A sequencing valve comprising:
    a body, wherein said body includes an interior compartment, an inlet port, a first outlet port and a second outlet port;
    a core element located within the interior compartment of said body that defines an inlet chamber adjacent to said inlet port, a first outlet chamber adjacent to said first outlet port, and a second outlet chamber adjacent to said second outlet port;
    a means for automatically sequencing fluid flow between said first and second outlet chambers in response to a selective fluctuation or interruption of fluid pressure mounted within said core element, said selective fluctuation or interruption being achieved by the manipulation of an exterior fluid source; and
    a cover plate, wherein said cover plate encloses said core element within said body.

2. A sequencing valve as claimed in claim 1, wherein said sequencing valve further includes
    a fluid inlet connected to the outside of said body wherein said fluid inlet surrounds said inlet port;
    a first fluid outlet connected to the outside of said body wherein said fluid inlet surrounds said first outlet port; and
    a second fluid outlet connected to the outside of said body wherein said fluid inlet surrounds said second outlet port.

3. A sequencing valve as claimed in claim 2, wherein said fluid inlet, said first and said second fluid outlets include a threaded arrangement.

4. A sequencing valve as claimed in claim 3, wherein said fluid inlet, said first and said second fluid outlets include quick connectors.

5. A sequencing valve as claimed in claim 2, wherein said sequencing valve includes a means for manually sequencing fluid flow between said first and second outlet chambers.

6. A sequencing valve as claimed in claim 2, wherein said body is cylindrical and further includes:
    a circular bottom wall; and
    a cylindrical peripheral wall including a bottom edge, wherein the bottom edge is fixedly attached to said circular bottom wall.

7. A sequencing valve, as claimed in claim 6, wherein said core element is releasably fastened to said body.

8. A sequencing valve, as claimed in claim 7, wherein said core element is releasably fastened to said body with threaded screws.

9. A sequencing valve as claimed in claim 8, wherein said core element is securely attached to said body.

10. A sequencing valve as claimed in claim 6, wherein said means for automatically sequencing fluid flow includes a valve positioned within said inlet chamber.

11. A sequencing valve as claimed in claim 10, wherein said valve is a gate valve.

12. A sequencing valve, as claimed in claim 10, wherein said core element further comprises:
    a top plate which includes, a top side and a bottom side;
    a first chamber wall in sealing engagement with said top plate, wherein said first chamber wall includes a first outlet opening;
    a second chamber wall in sealing engagement with said top plate, wherein said first chamber wall includes a second outlet opening, wherein said first and said second chamber walls define said inlet chamber;
    a piston wall in sealing engagement with said top plate, wherein said piston wall is positioned between said first and said second chamber walls, wherein said piston wall and said first chamber wall define said first outlet chamber, and said piston wall and said second chamber wall define said second outlet chamber;
    a passage extending through said piston wall;
    a piston including two ends disposed within said passage in said piston wall, movable between said first and said second outlet chambers in response to fluid pressure within said outlet chambers; and
    a component chamber on the top side of said inner structure.

13. A sequencing valve, as claimed in claim 12, wherein said core element further comprises a cylindrical flange in sealing engagement with the top side of said top plate, wherein said top plate and said flange form said component chamber.

14. A sequencing valve, as claimed in claim 13, wherein said core element includes an inner structure.

15. A sequencing valve, as claimed in claim 14, wherein said inner structure comprises hard plastic material.

16. A sequencing valve, as claimed in claim 15, wherein said hard plastic material is polycarbonate/acrylonitril butadiene styrene.

17. A sequencing valve, as claimed in claim 16, wherein said piston wall, said first and said second chamber walls are coated with a resilient layer.

18. A sequencing valve, as claimed in claim 15, wherein said resilient layer is a water resistant material.

19. A sequencing valve, as claimed in claim 16, wherein said resilient layer is selected from the group consisting of thermoplastic elastomer and rubber.

20. A sequencing valve as claimed in claim 16, wherein said valve is a two-sided flapper valve including a first sealing face and a second sealing face.

21. A sequencing valve as claimed in claim 20, wherein said top plate includes a centrally located bore therethrough; said flapper valve further comprises:
    a valve shaft centrally positioned within said core element and extending through the bore in said top plate, wherein said flapper valve is pivotally mounted on said valve shaft so that said flapper valve moves between said first outlet opening and said second outlet opening so that said first sealing face alternately engages said first outlet opening and said second sealing face engages said second outlet opening; and a sealing member in sealing engagement with said top plate and said valve shaft.

22. A sequencing valve as claimed in claim 21, wherein said sealing member is a seal.

23. A sequencing valve as claimed in claim 21, wherein said flapper valve comprises a durable material.

24. A sequencing valve as claimed in claim 23, wherein said flapper valve is comprised of a formaldehyde polymer.

25. A sequencing valve as claimed in claim 24, wherein said flapper valve is comprised of acetal.

26. A sequencing valve as claimed in claim 21, wherein said piston is cylindrical.

27. A sequencing valve as claimed in claim 26, further comprising:

a recess in said piston;

a pivot pin extending upward form said top plate, within said component chamber;

an arcuate slot though said top plate, proximate to said recess;

a valve lever arm, wherein said lever arm is attached to said valve shaft in said component chamber generally aligned with said flapper valve;

a piston lever including, a pivot end and an arcuate post, wherein said pivot end is pivotally engaged to said pivot pin, said arcuate post extends downward from said piston lever through said arcuate slot and engages said recess so that the movement of said piston pivots said piston lever; and a spring in said component chamber extending between and connected to said piston lever and said valve lever arm, configured such that said spring is compressed into an overcentered position in reaction to the movement of said piston, and sequentially to bias said flapper valve towards one of said first and second chamber walls in reaction to reduction of fluid pressure in the other one of said first and second chamber walls.

28. A sequencing valve as claimed in claim 27, wherein said cover plate is rotatably mounted on said body and interconnected with said valve lever arm.

29. A sequencing valve as claimed in claim 27, wherein said spring is a torsion spring.

30. A sequencing valve as claimed in claim 29, wherein said cover plate includes markings to identify which of said first and second outlet openings is configured for fluid flow therethrough.

31. A sequencing valve as claimed in claim 30, wherein said sequencing valve includes a means for manually sequencing fluid flow fluid flow between said first and second outlet chambers.

32. A sequencing valve as claimed in claim 31, wherein said means for manually sequencing fluid flow includes a finger engaging member connected to said flapper valve through said cover plate.

33. A sequencing valve comprising:

a cylindrical body, wherein said body includes
 a circular bottom wall,
 a cylindrical peripheral wall including a bottom edge, wherein the bottom edge is fixedly attached to said circular bottom wall,
 an interior compartment, formed by said circular bottom wall and said cylindrical peripheral wall,
 an inlet port in said peripheral wall,
 a first outlet port in said peripheral wall,
 a second outlet port in said peripheral wall;

a fluid inlet connected to the outside of said body wherein said fluid inlet surrounds said inlet port;

a first fluid outlet connected to the outside of said body wherein said fluid inlet surrounds said first outlet port;

a second fluid outlet connected to the outside of said body wherein said fluid inlet surrounds said second outlet port.

a core element located within the interior compartment of said body that defines an inlet chamber adjacent to said inlet port, a first outlet chamber adjacent to said first outlet port, and a second outlet chamber adjacent to said second outlet port, and includes
 a top plate which includes, a top side, a bottom side and a centrally located bore therethrough,
 a first chamber wall in sealing engagement with said top plate, wherein said first chamber wall includes a first outlet opening,
 a second chamber wall in sealing engagement with said top plate, wherein said first chamber wall includes a second outlet opening, wherein said first and said second chamber walls define said inlet chamber,
 a piston wall in sealing engagement with said top plate, wherein said piston wall is positioned between said first and said second chamber walls, wherein said piston wall and said first chamber wall define said first outlet chamber, and said piston wall and said second chamber wall define said second outlet chamber,
 a passage extending through said piston wall,
 a cylindrical piston including a recess and two ends disposed within the passage in said piston wall, movable between said first and said second outlet chambers in response to fluid pressure within said outlet chambers, and
 a component chamber on the top side of said inner structure,
 a water resistant resilient layer, wherein said resilient layer coats said piston wall, said first and said second chamber walls;

a two-sided flapper valve positioned within said inlet chamber, including
 a first sealing face and a second sealing face,
 a valve shaft centrally positioned within said core element and extending through the bore in said top plate, wherein said flapper valve is pivotally mounted on said valve shaft so that said flapper valve moves between said first outlet opening and said second outlet opening, so that the first sealing face alternately engages said first outlet opening and the second sealing face engages said second outlet opening,
 a sealing member in sealing engagement with said top plate and said valve shaft;

a pivot pin extending upward from said top plate, within said component chamber;

an arcuate slot through said top plate, proximate to said recess;

a valve lever arm, wherein said valve lever arm is attached to said valve shaft in said component chamber generally aligned with said flapper valve;

a piston lever including, a pivot end and an accurate post, wherein said pivot end is pivotally engaged to said pivot pin, said arcuate post extends downward from said piston lever through said arcuate slot and engages said recess so that the movement of said piston pivots said valve lever arm, which in turn pivots said flapper valve; and a spring in said component chamber extending between and connected to said piston lever and said valve lever arm, configured such that said spring is compressed into an overcentered position in reaction to the movement of said piston, and sequentially to bias said flapper valve towards one of said first and second chamber walls in reaction to reduction of fluid pressure in the other one of said first and second chamber walls; and a cover plate, wherein said cover plate encloses said core element within said body, is rotatably mounted on said body, and interconnected with said valve lever arm.

34. A sequencing valve as claimed in claim 33, further including a finger engaging member connected to said flapper valve through said cover plate to facilitate manual sequencing of fluid flow.

35. A sequencing valve comprising:

a body, wherein said body includes an interior compartment, an inlet port, a first outlet port, a second outlet port and defines an inlet chamber adjacent to said inlet port, a first outlet chamber adjacent to said first outlet port, and a second outlet chamber adjacent to said second outlet port;

a means for automatically sequencing fluid flow between said first and second outlet chambers in response to a selective fluctuation or interruption of fluid pressure mounted within said body; and a cover plate, wherein said cover plate encloses said body.

36. A sequencing valve comprising:

a body, wherein said body includes an interior compartment, an inlet port, a first outlet port and a second outlet port;

a core element located within the interior compartment of said body that defines an inlet chamber adjacent to said inlet port, a first outlet chamber adjacent to said first outlet port, a second outlet chamber adjacent to said second outlet port and a component chamber in fluid isolation from and covering said interior compartment;

a piston including a recess and two ends disposed between said first and said second outlet chambers;

a flapper valve positioned within said inlet chamber, including a valve shaft centrally positioned within said core element and extending into said component chamber, wherein said flapper valve is pivotally mounted on said valve shaft so that said flapper valve rotates to direct fluid flow between said first and said second outlet chambers;

a pivot pin extending upward in said component chamber;

an arcuate slot through said component chamber, proximate to said recess;

a lever arm, wherein said lever arm is attached to said valve shaft in said component chamber generally aligned with said flapper valve;

a lever including, a pivot end and a post, wherein said pivot end is pivotally engaged to said pivot pin, said post extends downward from said lever through said arcuate slot and engages said recess so that the movement of said piston pivots said lever arm, which in turn pivots said flapper valve;

a spring in said component chamber extending between and connected to said lever and said lever arm, configured such that said spring is compressed into an overcentered position in reaction to the movement of said piston, and sequentially to bias said flapper valve between said first and said second outlet chambers in response to reduction of fluid pressure in the other one of said first or said second outlet chambers; and a cover plate, wherein said cover plate encloses said core element within said body.

37. A sequencing valve comprising:

a body, wherein said body includes an interior compartment, an inlet port, a first outlet port and a second outlet port;

wherein said interior compartment includes a first interior wall, said first interior wall having a first passage through said first interior wall;

a second interior wall, said second interior wall having a second passage through said second interior wall;

a third interior wall having disposed therein a means for detecting fluid pressure changes in said interior compartment;

wherein said first and second interior walls define an inlet chamber adjacent said inlet port, said second and third interior walls define a first outlet chamber adjacent said first outlet port, and said first and third interior walls define a second outlet chamber adjacent said second outlet port;

a valve for sealing said first or second passage; and a means for communicating fluid pressure changes from said means for detecting fluid pressure changes in said interior compartment to said valve.

* * * * *

UNITED STATES PATENT AND TRADEMARK OFFICE
CERTIFICATE OF CORRECTION

PATENT NO : 6,050,286
DATED : April 28, 2000
INVENTOR(S) : Kruer et al.

It is certified that error appears in the above-identified patent and that said Letters Patent is hereby corrected as shown below:

In column 10, line 52, claim 18, delete "15" and insert therefor --17--.

In column 10, line 54, claim 19, delete "16" and insert therefor -- 18--.

In column 10, line 57, claim 20, delete "16" and insert therefor --18--.

Signed and Sealed this

Twenty-seventh Day of March, 2001

Attest:

NICHOLAS P. GODICI

*Acting Director of the United States Patent and Trademark Office*

*Attesting Officer*